US011334128B1

(12) United States Patent
Dickover (10) Patent No.: US 11,334,128 B1
(45) Date of Patent: May 17, 2022

(54) COOLER DEVICE AND METHODS FOR STORING AND COOLING AN ELECTRONIC MOBILE DEVICE

(71) Applicant: Dean Dwight Dickover, Lake Havasu City, AZ (US)

(72) Inventor: Dean Dwight Dickover, Lake Havasu City, AZ (US)

(*) Notice: Subject to any disclaimer, the term of this patent is extended or adjusted under 35 U.S.C. 154(b) by 433 days.

(21) Appl. No.: 16/530,726

(22) Filed: Aug. 2, 2019

Related U.S. Application Data (60) Provisional application No. 62/713,915, filed on Aug. 2, 2018.

(51) Int. Cl.
*G06F 1/20* (2006.01)
*H04M 1/04* (2006.01)
*G06F 1/16* (2006.01)

(52) U.S. Cl.
CPC ............ *G06F 1/203* (2013.01); *G06F 1/1632* (2013.01); *H04M 1/04* (2013.01); *F25D 2303/0831* (2013.01); *F25D 2331/809* (2013.01); *G06F 2200/201* (2013.01)

(58) Field of Classification Search
CPC .. G06F 1/203; G06F 1/1632; G06F 2200/201; H04M 1/04; F25D 2303/0831; F25D 2331/809
See application file for complete search history.

(56) References Cited

U.S. PATENT DOCUMENTS 2,526,165 A * 10/1950 Smith ...................... F25D 3/08
62/457.3
5,090,213 A * 2/1992 Glassman .......... A47G 19/2288
62/457.2
5,704,212 A * 1/1998 Erler ...................... F25B 21/04
361/679.41
5,746,151 A * 5/1998 Hestehave .............. B63B 17/00
114/343
7,068,508 B2 * 6/2006 Patel ...................... G06F 1/203
361/699
2005/0168191 A1 * 8/2005 Lee ........................... G06F 1/20
320/114
2006/0181840 A1 * 8/2006 Cvetko ................... B60R 11/02
361/679.55
2015/0359141 A1 * 12/2015 Fukuzono ............. H01L 23/473
361/699
2018/0288898 A1 * 10/2018 Jeong ...................... G06F 1/203
2018/0307284 A1 * 10/2018 Saravis ............... H05K 7/20172

* cited by examiner

*Primary Examiner* — Emmanuel E Duke
(74) *Attorney, Agent, or Firm* — Parsons & Goltry, PLLC; Michael W. Goltry; Robert A. Parsons (57) ABSTRACT

A cooler device for receiving, storing, and cooling an electronic mobile device includes a housing defining an enclosed volume and including, a top, a bottom, a cradle, and air flow conduits. The cradle depends downwardly from the top to a base in the volume, has an opening at the top, and defines a storage compartment between the opening and the base and configured to receive the electronic mobile device therein through the opening. The air-flow conduits are coupled between the base of the cradle and the bottom of the housing and define air flow channels coupling the storage compartment at the base of the cradle to an ambient atmosphere outside the housing at the bottom of the housing in gaseous communication. The volume is filled with a refrigerant in direct contact against a volume-facing surface of the cradle and a continuous volume-facing surface of each of the air-flow conduits.

20 Claims, 9 Drawing Sheets

COOLER DEVICE AND METHODS FOR STORING AND COOLING AN ELECTRONIC MOBILE DEVICE

CROSS-REFERENCE TO RELATED APPLICATIONS

This application claims the benefit of U.S. Provisional Application No. 62/713,915, filed Aug. 2, 2018, the entire contents of which are incorporated herein by reference.

FIELD OF THE INVENTION

The present invention relates generally to electronic mobile devices, especially mobile phones and tablet computers, and, more particularly, to a cooler device for safely storing and cooling electronic mobile devices.

BACKGROUND OF THE INVENTION

Electronic mobile devices, often referred to simply as mobile devices, are computing devices small enough to hold and operate by hand. Of particular significance of well-known battery-powered electronic mobile devices, such as smartphones or mobile phones and tablet computers that can connect to an Internet. These devices are common in the not only are they battery-powered they will also have flatscreen interface with digital buttons and keyboard or physical buttons along with a physical keyboard. Most such devices are enabled to connect to an Internet and interconnect with other devices. Integrated cameras, digital media players, the ability to place and receive telephone calls, and other capabilities are common. Power to these mobile devices is typically provided by a lithium battery or battery pack. Mobile devices may additionally run mobile operating systems that allow third-party applications to be installed and run.

Electronic mobile devices are inherently and notoriously susceptible to overheating in high ambient temperatures and direct sunlight. This often renders the mobile devices unworkable until cooled to a lower operating temperature. Overheating of a mobile device can also inherently occur when the mobile device is under a high or prolonged workload. Although skilled artisans have developed varieties of cooling devices designed to attempt to cool mobile devices, advances in the field have not been entirely satisfactory, and have yielded cooling devices that are prohibitively expensive, difficult to construct, and mechanically complex, thereby necessitating continued improvement in the art.

SUMMARY OF THE INVENTION

According to the principle of the invention, a cooler device for receiving, storing, and cooling an electronic mobile device includes a housing defining and enclosed volume and including a top, a bottom, a cradle, and at least one air-flow conduit. The cradle depends downwardly into the volume from the top of the housing to a base of the cradle in the volume between the top of the housing and the bottom of the housing. The cradle includes an opening at the top of the housing, a volume-facing surface from the top of the housing to and including the base of the cradle, and an inner surface from the top of the housing to and including the base of the cradle defining a storage compartment between the opening of the cradle and the base of the cradle and configured to receive the electronic mobile device therein through the opening of the cradle. The at least one air-flow conduit is coupled between the base of the cradle and the bottom of the housing and includes a continuous volume-facing surface from the base of the cradle to the bottom of the housing, and a continuous inner surface from the base of the cradle to the bottom of the housing and defining an airflow channel coupling the storage compartment of the cradle to an ambient atmosphere outside the housing in gaseous communication. The volume is filled with a refrigerant in direct contact against the volume-facing surface of the cradle and the continuous volume-facing surface of the at least one air-flow conduit. Preferably, the refrigerant envelops a) the cradle from the top of the housing to the base of the cradle, and thereby the volume-facing surface of the cradle from the top of the housing to the base of the cradle, and b) the at least one air-flow conduit from the base of the cradle to the bottom of the housing, and thereby the volume-facing surface of the at least one air-flow conduit from the base of the cradle to the bottom of the housing. The cradle additionally includes a standoff structure for interacting between the base of the cradle and the electronic mobile device for holding the electronic mobile device away from the base of the cradle, when the electronic mobile device is inserted into the storage compartment of the cradle through the opening of the cradle. The standoff structure includes standoff prominences each configured to directly contact the electronic mobile device, when the electronic mobile device is inserted into the storage compartment of the cradle through the opening of the cradle. The standoff prominences are carried by the base of the cradle, and extend upright into the storage compartment of the cradle. The standoff prominences are on either side of the air-flow channel. The standoff prominences are identical in a particular embodiment. The housing has a sufficient rigidity to not collapse. The bottom of the housing defines a ventilation channel that opens downwardly from the air-flow channel and extends from a first end of the housing to a second end of the housing. The ventilation channel has a center that extends from the first end of the housing to the second end of the housing, and the air flow channel opens outwardly to the center of the ventilation channel. The ventilation channel has an inverted U-shape in an exemplary embodiment.

According to the principle of the invention, a cooler device for receiving, storing, and cooling an electronic mobile device includes a housing defining an enclosed volume and including a top, a bottom, a cradle, and air-flow conduits. The housing defines an enclosed volume and includes a top, a bottom, a cradle depending downwardly into the volume from the top of the housing to a base of the cradle in the volume between the top of the housing and the bottom of the housing. The cradle includes an opening at the top of the housing, a volume-facing surface from the top of the housing to and including the base of the cradle, and an inner surface from the top of the housing to and including the base of the cradle defining a storage compartment between the opening of the cradle and the base of the cradle and configured to receive the electronic mobile device therein through the opening. The air-flow conduits are coupled between the base of the cradle and the bottom of the housing, are spaced apart, and each includes a continuous volume-facing surface from the base of the cradle to the bottom of the housing, and a continuous inner surface from the base of the cradle to the bottom of the housing and defining an airflow channel coupling the storage compartment of the cradle to an ambient atmosphere outside the housing in gaseous communication. The volume is filled with a refrigerant in direct contact against the volume-facing surface of the cradle and the continuous volume-facing surfaces of the air flow conduits. Preferably, the refrigerant envelops a) the cradle from the top of the housing to the base of the cradle, and thereby the volume-facing surface of the cradle from the top of the housing to the base of the cradle, and b) the air-flow conduits from the base of the cradle to the bottom of the housing, and thereby the continuous volume-facing surfaces of the air-flow conduits from the base of the cradle to the bottom of the housing. The cradle additionally includes a standoff structure for interacting between the base of the cradle and the electronic mobile device for holding the electronic mobile device away from the base of the cradle, when the electronic mobile device is inserted into the storage compartment of the cradle through the opening of the cradle. The standoff structure includes standoff prominences each configured to directly contact the electronic mobile device, when the electronic mobile device is inserted into the storage compartment of the cradle through the opening of the cradle. The standoff prominences are carried by the base of the cradle, and extend upright into the storage compartment of the cradle. The standoff prominences are on either side of each of the air-flow channels. In a particular embodiment, the standoff prominences are identical. The housing has a sufficient rigidity to not collapse. The bottom of the housing defines a ventilation channel that opens downwardly from the air-flow channels and extends from a first end of the housing to a second end of the housing. The ventilation channel has a center that extends from the first end of the housing to the second end of the housing, and the air flow channels open outwardly to the center of the ventilation channel. The ventilation channel has an inverted U-shape in an exemplary embodiment.

BRIEF DESCRIPTION OF THE DRAWINGS

Referring to the drawings.

DETAILED DESCRIPTION

Figure 1:
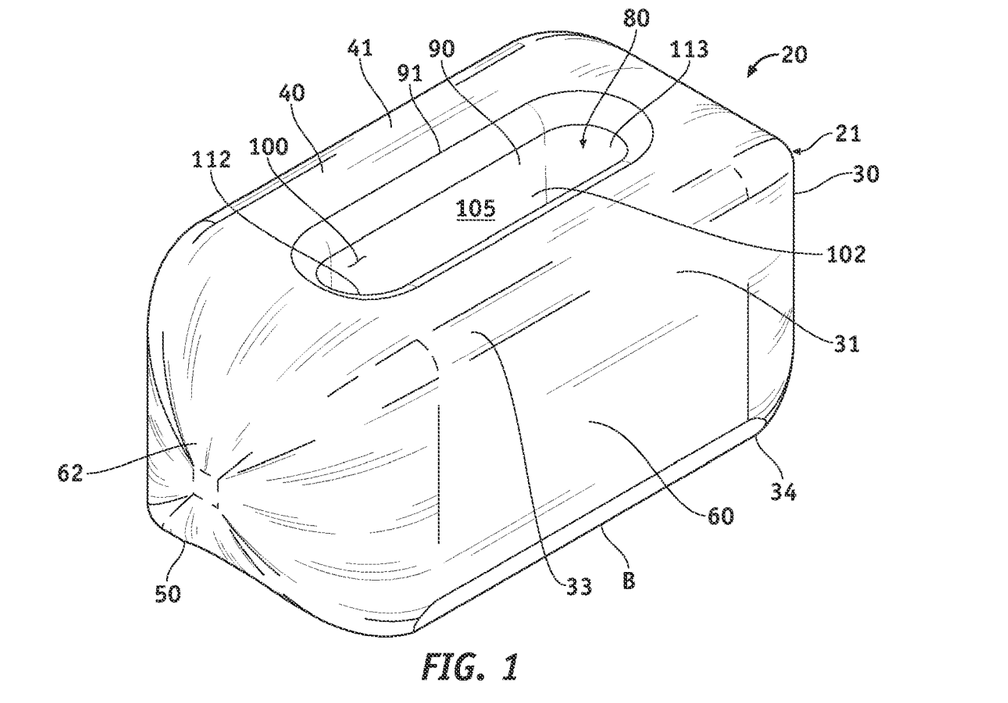
FIG. 1 is a top perspective view of a cooler device for receiving, storing, and cooling an electronic mobile device.
Figure 2:
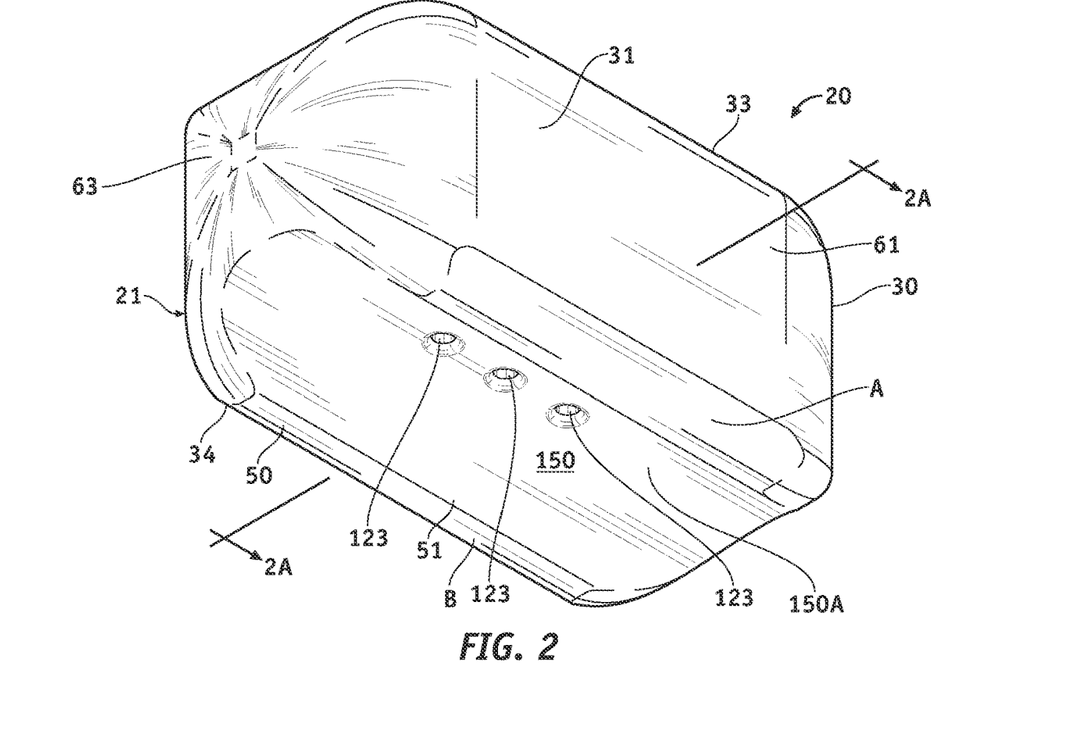
FIG. 2 is a bottom perspective view of the embodiment of FIG. 1.
Figure 2A:
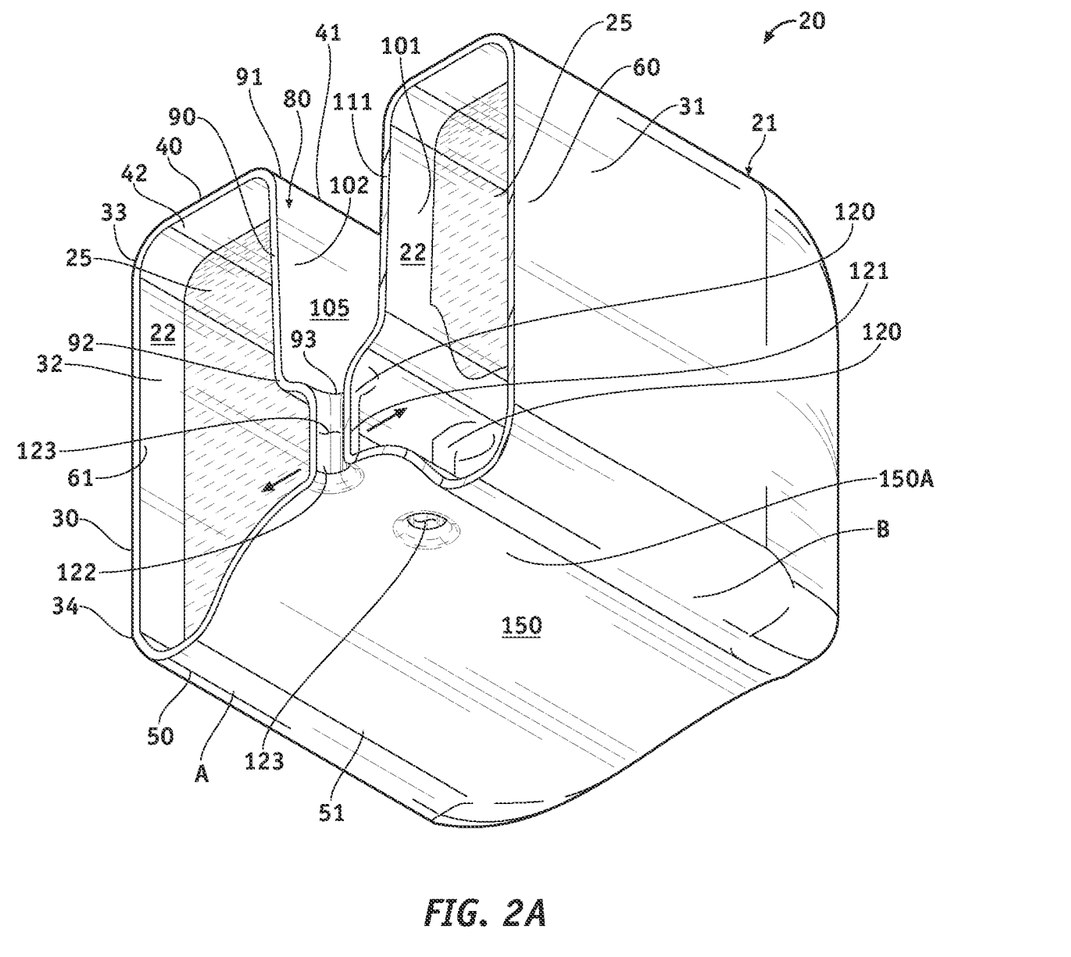
FIG. 2A is a section view taken along line 2A-2A of FIG. 2 illustrating a refrigerant in a volume of the housing, wherein the refrigerant is partially broken away to better illustrating the volume of the housing.
Figure 3:
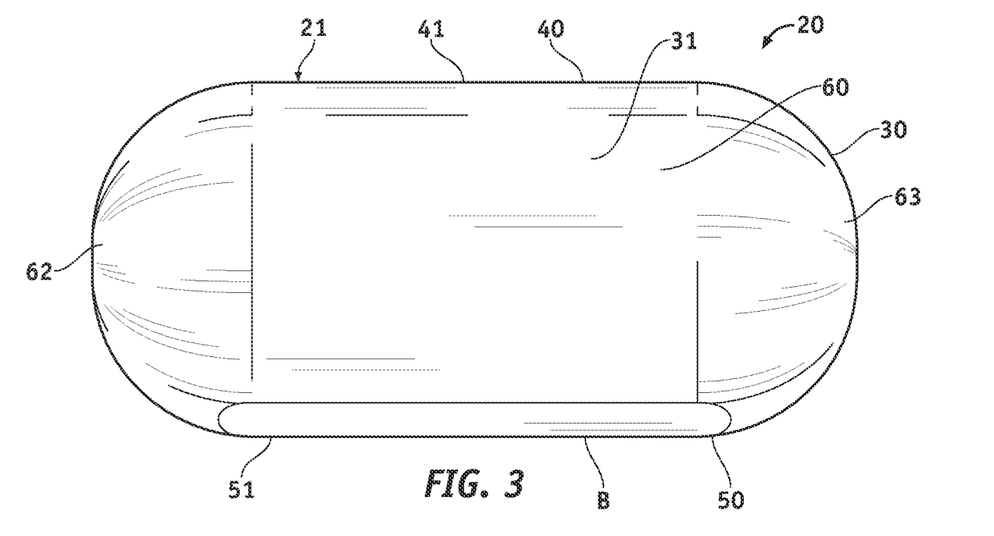
FIG. 3 is a side elevation view of the embodiment of FIG. 1, the opposite side elevation view being the same thereof.
Figure 4:
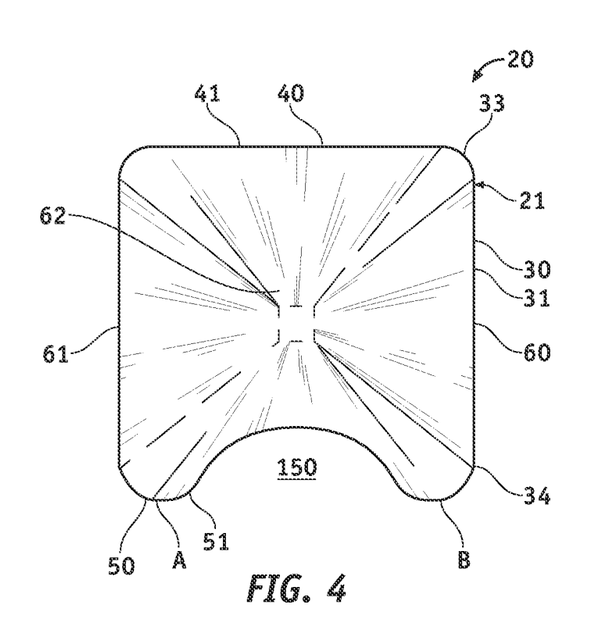
FIG. 4 is an end elevation view of the embodiment of FIG. 1, the opposite end elevation view being the same thereof.

Turning now to the drawings, in which like reference characters indicate corresponding elements throughout the several views, attention is directed in relevant part to FIGS. 1-6 illustrating cooler device 20 for receiving, storing, and cooling an electronic mobile device. Cooler device 20 is easy to use, portable, being easily movable and carried about by hand, simple in structure, unpowered, inexpensive, has no moving or electrical parts, and includes housing 21 defining enclosed volume 22 in FIGS. 2A, 7, and 8, filled with refrigerant 25 in FIGS. 7 and 8. In FIG. 2A, refrigerant 25 is partially broken away to better illustrate volume 22 of housing 21. Refrigerant 25 is a conventional freezable gel or gel-like substance, and any suitable freezable liquid, including water, may be utilized or any of several conventional freezable gel-like substances. Volume 22 is unitary in this example, being undivided, and is additionally fluid impervious, which disables refrigerant 25 from leaking outwardly from volume 22 through housing 21. Housing 21 is formed of an inherently fluid impervious and thermally-conductive material or combination of materials, such as plastic, thermoplastic, metal, polycarbonate, polypropylene, polystyrene, nylon, carbon fiber, or other chosen fluid impervious material or combination of fluid impervious materials whether transparent or opaque and having an inherent and sufficient rigidity for housing 21 to not collapse. In a preferred embodiment, housing 21 is injection molded or 3D printed from polycarbonate, polypropylene, polystyrene, nylon, or the like.

Referring in relevant part to FIGS. 1-8, which includes FIG. 2A, housing 21 includes upright, continuous sidewall 30 having outer surface 31, inner surface 32, upper edge 33, and lower edge 34. Horizontal top 40 is affixed to upper edge 33, and includes outer surface 41 and inner surface 42. Bottom 50 is affixed to lower edge 33, and includes outer surface 51 and inner surface 52. Upper edge 33 and lower edge 34 are rounded in this example.

Continuous sidewall 30 includes opposite upright side walls 60 and 61 that extend between opposite upright end walls 62 and 63. Side walls 60 and 61 define the sides of housing 21. End walls 62 and 63 define the ends of housing 21. Side walls 60 and 61 are coextensive and equal in length, and are longer than end walls 62 and 63, which are coextensive, equal in length, and bulge outwardly in this example. Side walls 60 and 61 are parallel relative to each other, and the length of housing 21 from outwardly bulged end wall 62 to outwardly bulged end wall 63 is greater than the width of housing 21 from side wall 60 to side wall 61 and the depth of housing 21 from top 40 to bottom 50. Housing 21 is generally rectangular in shape and blocky, and can be formed as square or other chosen shape consistent with this disclosure.

Housing 21 additionally includes an upright pocket or cradle 80 in FIGS. 1, 2A, 5, 7, and 8. Cradle 80 is configured to receive and hold a heat-sensitive article, especially an electronic mobile device as disclosed herein, such as a mobile phone or smartphone, or a tablet computer. Referring in relevant part to FIGS. 1, 2A, 5, 7, and 8, cradle 80 includes upright continuous sidewall 90 including upper edge 91, lower edge 92, and horizontal base 93 affixed to lower edge 92. Upper edge 91 is affixed centrally to top 40 and defines opening 100 of cradle 80. Opening 100 is centrally located at top 40. Cradle 80 depends downwardly toward bottom 50 from upper edge 91 affixed centrally to top 40 and opening 100 centrally into volume 22 to base 93 in volume 22 between inner surface 42 of top 40 and inner surface 52 of bottom 50. Cradle 80 extends upright through volume 22 from base 93 to upper edge 91 and opening 100 at top 40. Opening 100 opens upwardly to outer surface 41 of top 40. Continuous sidewall 90 and base 93 together define a volume-facing surface 101 of cradle 80, and an inner surface 102 of cradle 80. Volume-facing surface 101 extends from top 40 of housing 21 to and including base 93 of cradle 80. Inner surface 102 extends from top 40 of housing 21 to and including base 93 of cradle 80, and defines a storage compartment 105 of cradle 80 between opening 100 and base 93. Storage compartment 102 extends upright from base 93 to opening 100 at top 40, and is configured to receive and hold an electronic mobile device. Cradle 80 and its storage compartment 105 are altogether elongate and extend longitudinally in a direction from end wall 62 of housing 21 to end wall 63 of housing 21. Storage area 105 has a shape that corresponds to the shape of an electronic mobile device to be received and held therein in an upright orientation.

Continuous sidewall 90 of cradle 80 includes opposite, upright side walls 110 and 111 that extend between opposite, upright end walls 112 and 113. Side walls 110 and 111 define the sides and width of cradle 80. End walls 112 and 113 define the ends and length of cradle 80. Side wall 110 is between storage compartment 105 and side wall 60 of housing 21, side wall 111 is between storage compartment 105 and side wall 61 of housing 21, end wall 112 is between storage compartment 105 and end wall 62 of housing 21, and end wall 113 is between storage compartment 105 and end wall 63 of housing 21. Side walls 110 and 111 are coextensive and equal in length, and are longer than end walls 112 and 113, which are coextensive and equal in length and bulge outwardly. Side walls 110 and 61 are generally parallel relative to each other and to side walls 60 and 61 of housing 21. The length of cradle 110 and its storage compartment 105 from outwardly bulged end wall 112 to outwardly bulged end wall 113 is greater than the width of cradle 80 and its storage compartment 105 from side wall 110 to side wall 111 and the depth of cradle 80 and its storage compartment 105 from opening 200 at top 40 to base 93, which is less than the length of cradle 110 and its storage compartment 105 from outwardly bulged end wall 112 to outwardly bulged end wall 113 and greater than the width of cradle 80 and its storage compartment 105 from side wall 110 to side wall 111. Accordingly, cradle 80 and storage compartment 105 are generally rectangular in shape. For reference purposes, storage compartment 105 has a length L in FIG. 9 from outwardly bulged end wall 112 to outwardly bulged end wall 113, a width W in FIG. 7 from side wall 110 to side wall 111, and a depth D from opening 100 at top 40 to base 93, in which length L is greater than width W, and depth D is less than length L and greater than width W. Length L, depth D, and width W of storage compartment 105 are sufficient to enable storage compartment 105 to receive and hold an electronic mobile device upright.

Figure 5:
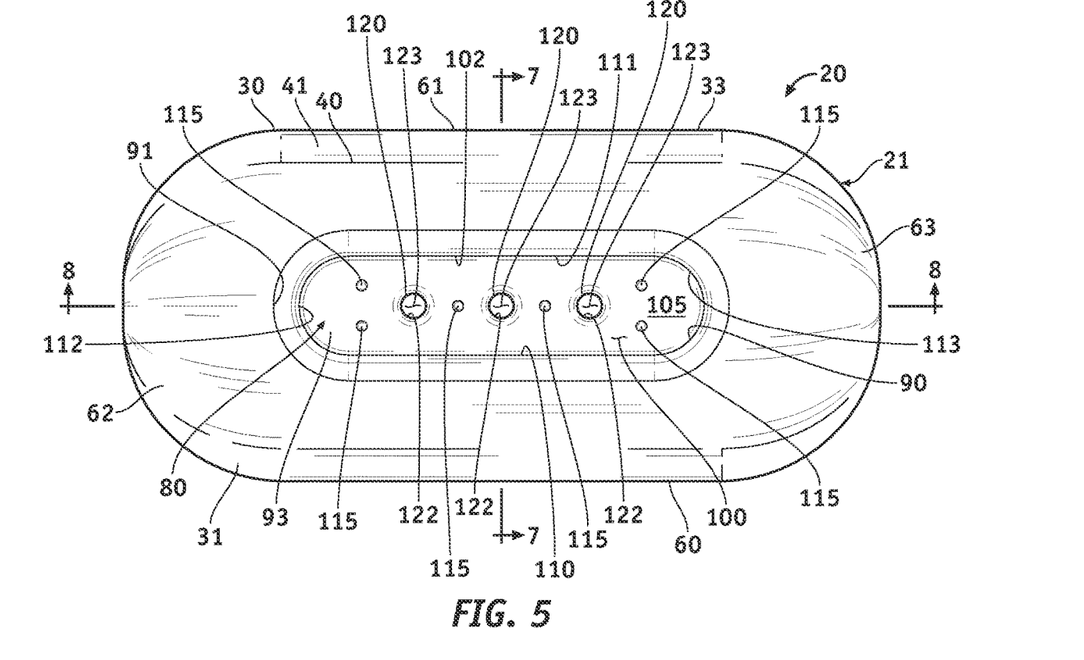
FIG. 5 is a top plan view of the embodiment of FIG. 1.
Figure 6:
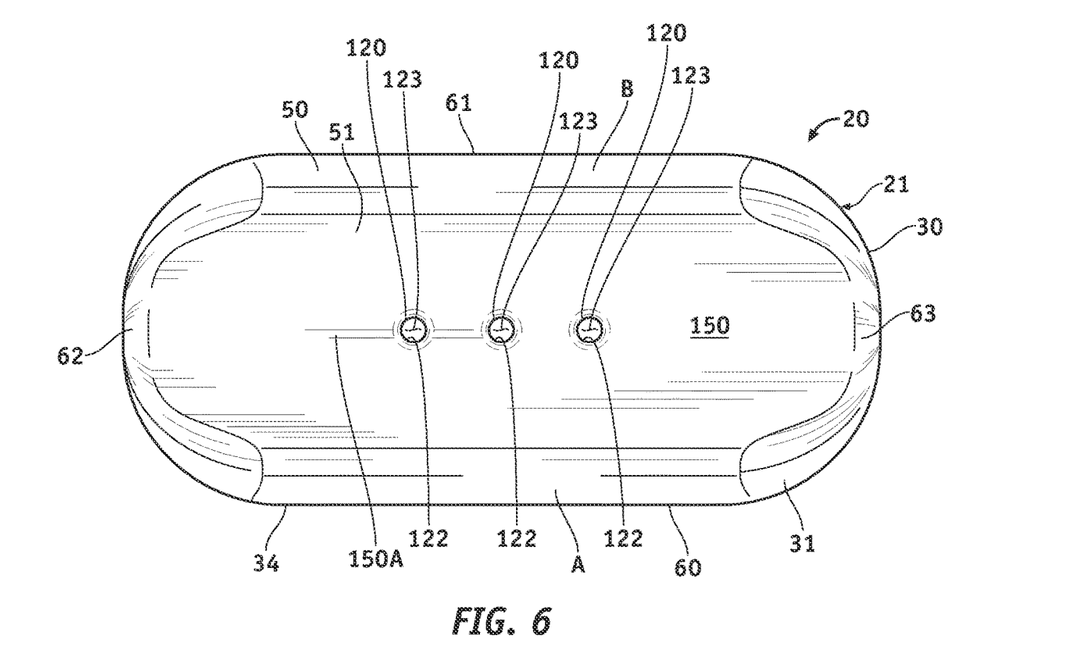
FIG. 6 is a bottom plan view of the embodiment of FIG. 1.
Figure 7:
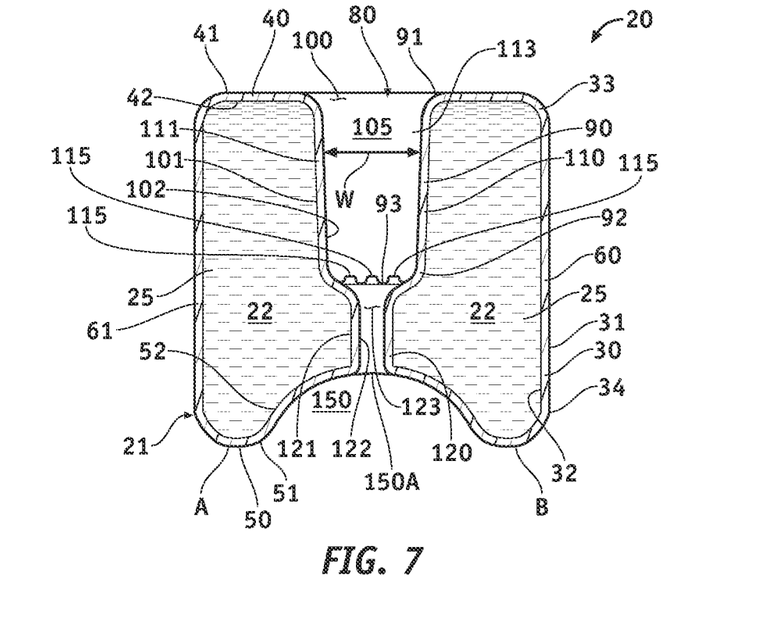
FIG. 7 is a section view taken along line 7-7 of FIG. 5.
Figure 8:
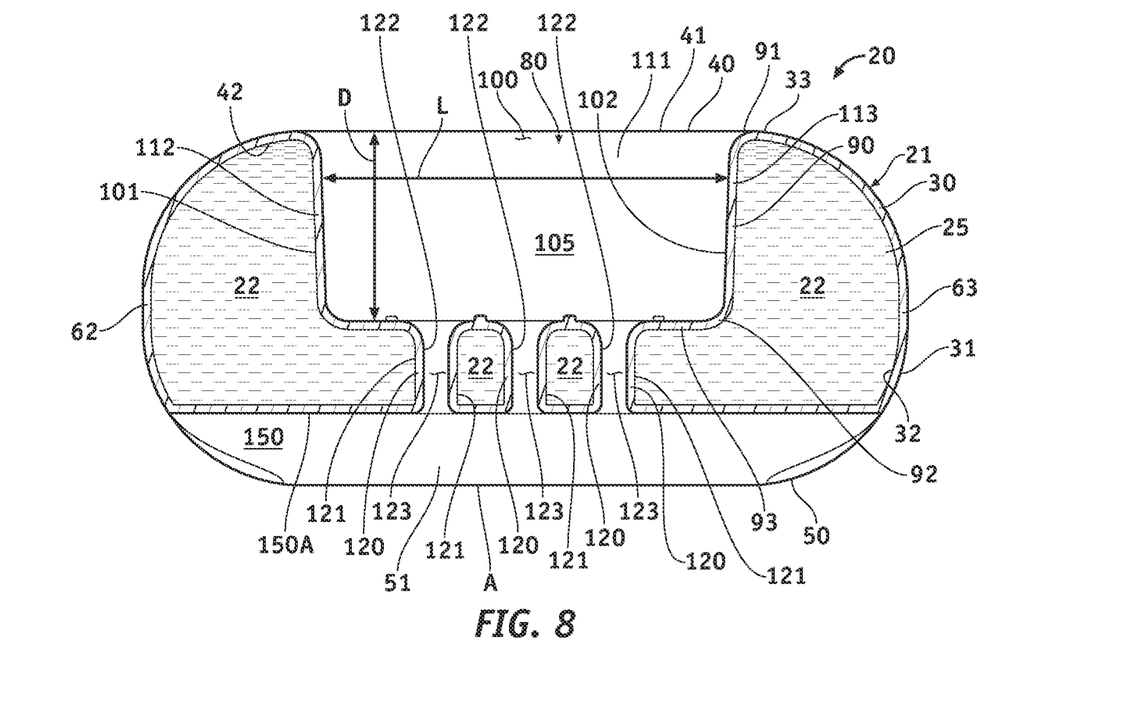
FIG. 8 is a section view taken along line 8-8 of FIG. 5.

Cradle 80 is formed with a standoff structure for interacting between base 93 of cradle 80 and an electronic mobile device placed in storage compartment 105 for holding the electronic mobile device away from or otherwise above base 93 of cradle 80, when the electronic mobile device is installed/inserted into storage compartment 105 of cradle 80 through opening 100. In FIGS. 5, 7, and 8, the standoff structure includes prominences 115 each configured to directly contact the electronic mobile device, when the electronic mobile device is installed/inserted into storage compartment 105 of cradle 80 through opening 100. Standoff prominences 171 are spacers in the form of protuberances or protuberant structures. Standoff prominences 115 are carried inner surface 122 of base 93, and each project upwardly from inner surface of base 93 into storage compartment 105 away from inner surface 102 of base 93 toward opening 100. Standoff prominences 115 are rigidly affixed to inner surface 122 of base 93, and are preferably molded with inner service 93. Standoff prominences 115 formed in base 93 are identical, being equal in size and shape, are spaced-apart, and are dispersed along base 93 along the length of cradle 80 between end walls 112 and 113.

Referring in relevant part to FIGS. 2A, 7, and 8, housing 21 additionally includes air-flow conduits 120 coupled between base 93 of cradle 80 and bottom 50 of housing 21 thereby coupling storage compartment 105 of cradle 80 to an ambient atmosphere outside housing 21 in gaseous communication. Air-flow conduits 120, elongate pipes or tubes, are identical, are spaced apart along the length of cradle 80 between end walls 112 and 113, are affixed to and extend between base 93 and bottom 50, are in volume 22, and extend downwardly through volume 22 from base 93 to bottom 50. Being spaced apart in volume 22, volume 22 separates one air-flow conduit 120 from the other, and generally indicated the opposite pointing arrows in FIG. 2A, which are intended to depict how volume 22 extends between adjacent air-flow conduits 120 from one side of volume 22 at one side 60 of housing 21 to the other side of volume 22 at the other side 61 of housing 21. Air-flow conduits 120 are preferably molded with base 93 and bottom 50. Air-flow conduits 120 cooperate with cradle 80 to form an integral mobile device storage and cooling structure coupled between top 40 and bottom 50, and which extends upright centrally through volume 22 from air-flow conduits 120 affixed to bottom 50 to cradle 80 and upright to opening 100 of cradle at top 40 and upper edge 91 of cradle 80 affixed to top 40.

Preferably, air-flow conduits 120 are affixed centrally to base 83 equidistant between side walls 110 and 111 of cradle 80 and centrally to bottom 50 equidistant between side walls 60 and 61 of housing 21. Each air-flow conduit 120 includes continuous volume-facing surface 121 extending from base 93 of cradle 80 to bottom 50 of housing 21, and continuous inner surface 122 extending from base 93 of cradle 80 to bottom 50 of housing 21. Each continuous inner surface 122 defines an airflow channel 123 from storage compartment 105 at inner surface 122 of base 93 to an ambient atmosphere at outer surface 51 of bottom 50 thereby coupling storage compartment 105 to the ambient atmosphere outside bottom 50 of housing 21 in gaseous communication. Each air-flow channel 123 opens upwardly to inner surface 122 of base 93 to storage compartment 105, and opens downwardly to outer surface 51 of bottom 50 to the ambient atmosphere. In FIGS. 5 and 8, standoff prominences 115 are formed on either side of each air-flow conduit 120 and, thus, each air-flow channel 123.

With continuing reference in relevant part to FIGS. 2A, 7, and 8, inner surface 32 of continuous sidewall 30, inner surface 42 of top 40, inner surface 52 of bottom 50, volume-facing surface 101 of cradle 80, and volume-facing surfaces 121 of air-flow conduits 120 cooperate to define and shape enclosed volume 22, which envelops cradle 80 from top 40 of housing 21 to base 93 of cradle 80, and thereby volume-facing surface 101 of cradle 80 from top 40 of housing 21 to base 93 of cradle 80, and each air-flow conduit 120 from base 93 of cradle 80 to bottom 50 of housing 21, and thereby continuous volume-facing surface 121 of each air-flow conduit 120 from base 93 of cradle 80 to bottom 50 of housing 21. Since volume 22 is filled with refrigerant 25, refrigerant 25 is held/supported in volume 22 by housing 21, takes the shape of volume 22, is in direct contact against inner surface 32 of continuous sidewall 30, inner surface 42 of top 40, and inner surface 52 of bottom 50, and, according to the invention, and is in direct contact against volume-facing surface 101 of cradle 80, and continuous volume-facing surface 121 of each air-flow conduit 120. In a further and more specific aspect, since volume 22 envelopes cradle 80 and air-flow conduits 120 described above, refrigerant 25 identically envelops cradle 80 from top 40 of housing 21 to and including base 93 of cradle 80, and thereby volume-facing surface 101 of cradle 80 from top 40 of housing 21 to and including base 93 of cradle 80, and each air-flow conduit 120 from base 93 of cradle 80 to bottom 50 of housing 21, and thereby each continuous volume-facing surface 121 of each air-flow conduit 120 from base 93 of cradle 80 to bottom 50 of housing 21. The enveloping contact of refrigerant 25 directly against volume-facing surface 101 of cradle 80 from top 40 to and including base 93 and continuous volume-facing surface 121 of each of the air-flow conduits 120 from base 93 to bottom 50 enables refrigerant 25 to surround volume-facing surface 101 of cradle 80 and continuous volume-facing surfaces 121 of air-flow conduits 120 with a cooling temperature imparted to refrigerant 25 for aggressively, evenly, and completely cooling storage compartment 105 and air-flow channels 123, according to the invention. The inherent thermally-conductive material characteristic of housing 21 enables the cooling temperature imparted to refrigerant to be conducted by cradle 80 to into storage compartment 105 and to be conducted by air-flow conduits 120 to into air-flow channels 123.

In FIGS. 1, 4, 6, 7, and 8, bottom 50 of housing 21 defines a ventilation channel 150 operatively coupled to air-flow channels 123. Ventilation channel 150 opens downwardly from air-flow channels 123 in FIGS. 2, 7, and 8 and extends longitudinally along the length of housing 21 from the end of housing 21 defined by end wall 62 to the end of housing 21 defined by end wall 63. Bottom 50 is shaped/contoured to form ventilation channel 150 by outer surface 51, which extends upwardly along the length of housing 21, from the end of housing 21 defined by end wall 62 to the end of housing 21 defined by end wall 63, toward top 40 from either side of housing 21 to air flow channels 123 at center 150A of ventilation channel 150, which is the high point of ventilation channel 150. This forms elongate platforms A and B in outer surface 51 of bottom 50 at either side of housing 21 that are parallel relative to each other and extend along the length of housing 21 from the end of housing 21 defined by end wall 62 to the end of housing 21 defined by end wall 63. Platforms A and B are configured to support cooler device 20 upright from bottom 50 to top 40 when placed on a supporting surface, such as a table, countertop, vehicle dashboard, or the like. In this example, ventilation channel 150 has an inverted U-shape.

Figure 13:
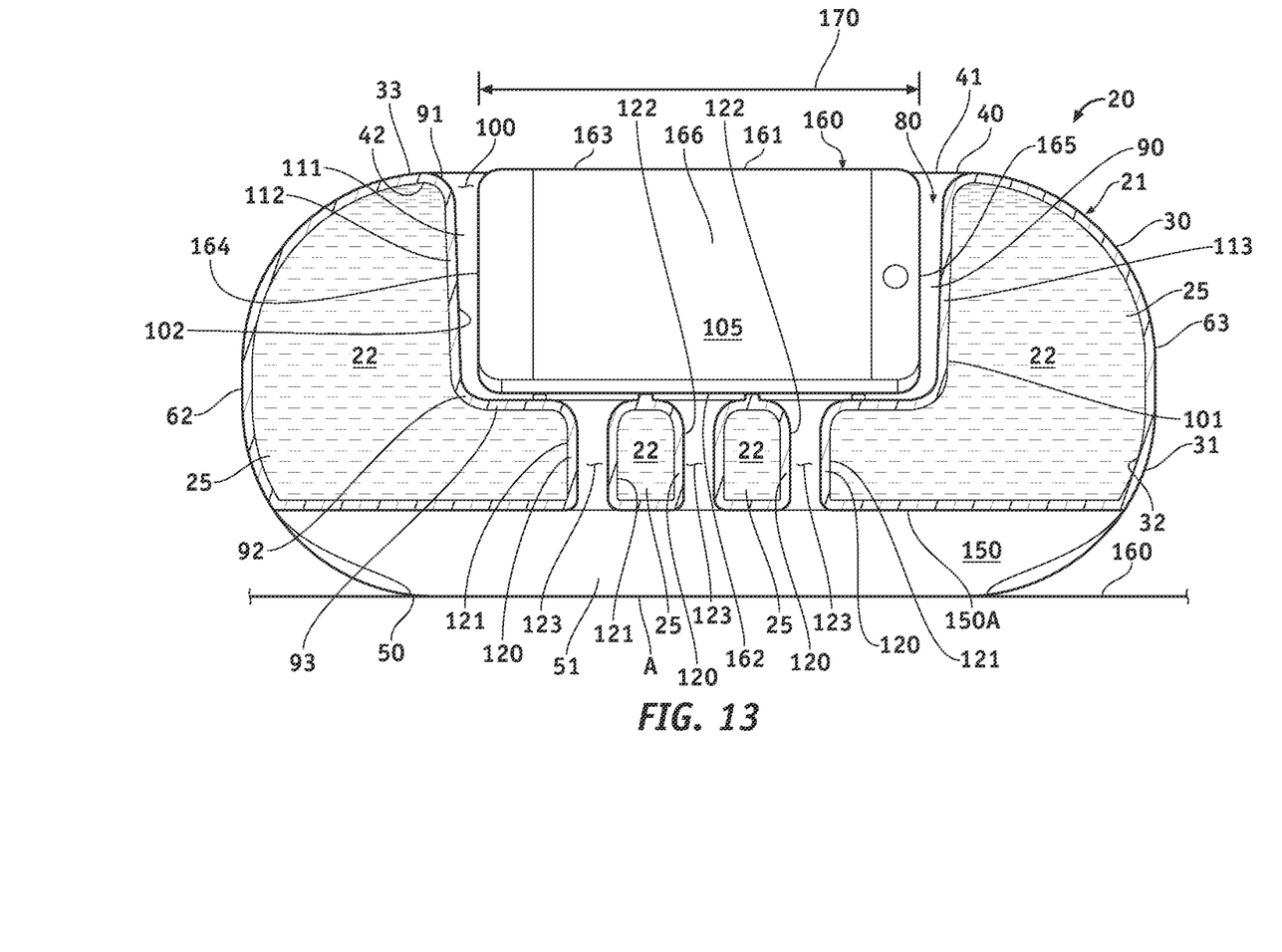
FIG. 13 is a section view taken along line 13-13 of FIG. 10, the mobile device being not sectioned for illustrative purposes.

In use, refrigerant 25 is chilled or frozen, such as by placing cooler device 20 in a refrigerator or freezer until refrigerant 25 is chilled or frozen. Since refrigerant 25 surrounds volume-facing surface 101 of cradle 80 and continuous volume-facing surfaces 121 of air-flow conduits 120, the inherent thermally-conductive material characteristic of housing 21 enables the cooling temperature imparted to refrigerant 25 to be efficiently and completely conducted by cradle 80 to into storage compartment 105 and by air-flow conduits 120 to into air-flow channels 123 for keeping storage compartment 105 and air-flow channels 123 maintained in a cool or low temperature condition for a prolonged period of time. After removing cooler device 20 from the refrigerator or freezer, cooler device 20 can be positioned upright from bottom 50 to top 40, such as by positioning platforms A and B against an underlying supporting surface 160 as shown in FIG. 13 for supporting cooler device 20 upright from bottom 50 to top 40. Ventilation channel 150 extends upright from platforms A and B over underlying support surface 160 and is enabled to ventilate air therethrough without interference from support surface 160 onto which cooler device 20 placed. An electronic mobile device, such as the one denoted at 160 in FIG. 9, is placed into storage compartment 105 in FIGS. 10 and 11 through opening 100 for being stored upright and cooled therein.

As explained above, electronic mobile devices, often referred to simply as mobile devices, are computing devices small enough to hold and operate by hand. Of particular significance are well-known battery-powered electronic mobile devices, such as smartphones or mobile phones and tablet computers that can connect to an Internet. These devices are common in the not only are they battery-powered, they will also have flatscreen interface with digital buttons and keyboard or physical buttons along with a physical keyboard. Most such devices are enabled to connect to an Internet and interconnect with other devices. Integrated cameras, digital media players, the ability to place and receive telephone calls, and other capabilities are common. Power to these mobile devices is typically provided by a lithium battery or battery pack. Mobile devices may additionally run mobile operating systems that allow third-party applications to be installed and run.

Electronic mobile device 160 is generally representative of a standard mobile phone or smartphone described briefly above, which is battery-powered and inherently susceptible to overheating, and customarily flat and thin, and generally rectangular in shape as defined by its perimeter edge 161, defined by opposed, parallel sides 162 and 163 and opposed parallel ends, extending between its flat major surfaces, namely, back surface 166 and its opposed parallel display or user-interface surface 167. Storage compartment 105 is sized to accept and contain mobile device 160 and hold it upright as will now be explained.

Figure 9:
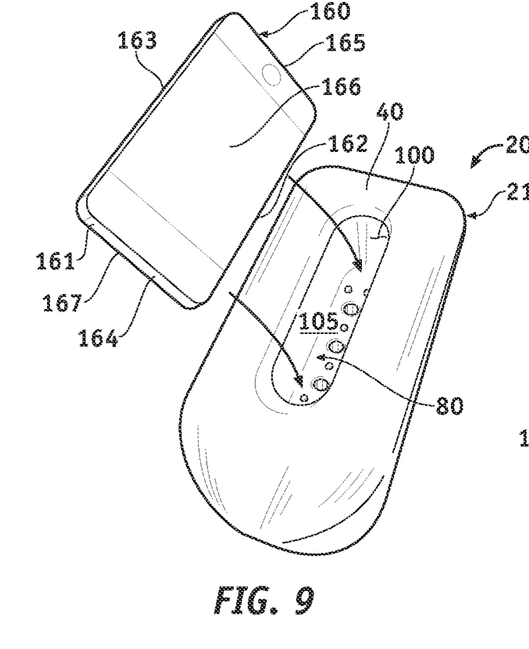
FIG. 9 is a perspective view illustrating a mobile device as it would appear being placed into a storage compartment of a cradle of the embodiment of FIG. 1.
Figure 10:
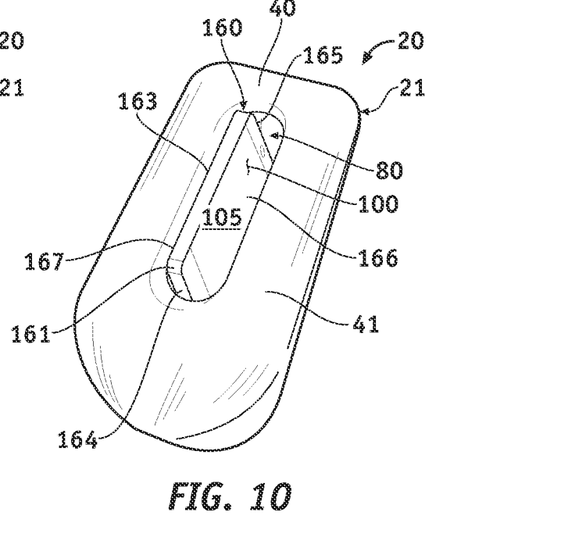
FIGS. 10 and 11 are perspective views corresponding to FIG. 9 illustrating the mobile device as it would appear placed into the storage compartment of the cradle.
Figure 11:
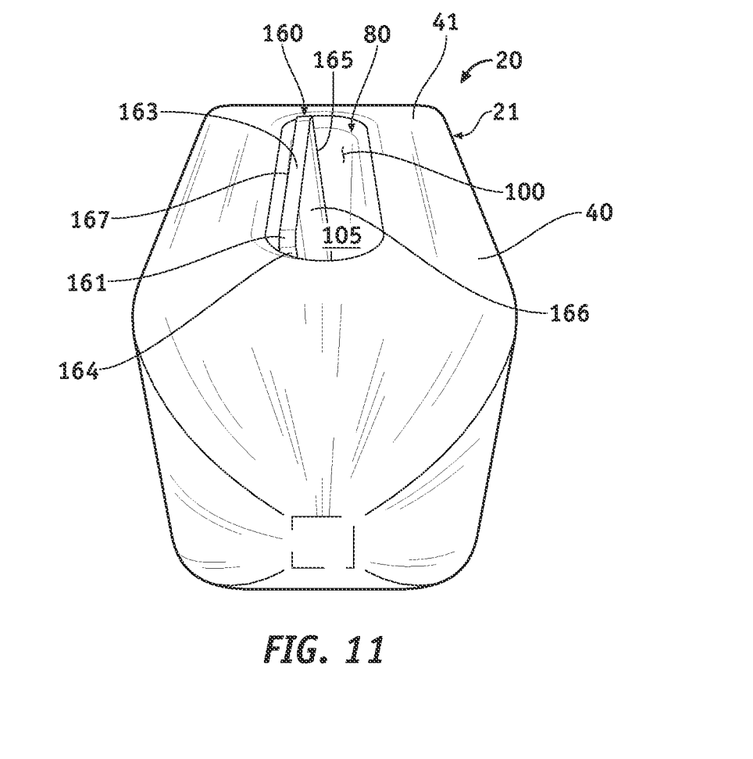
Figure 12:
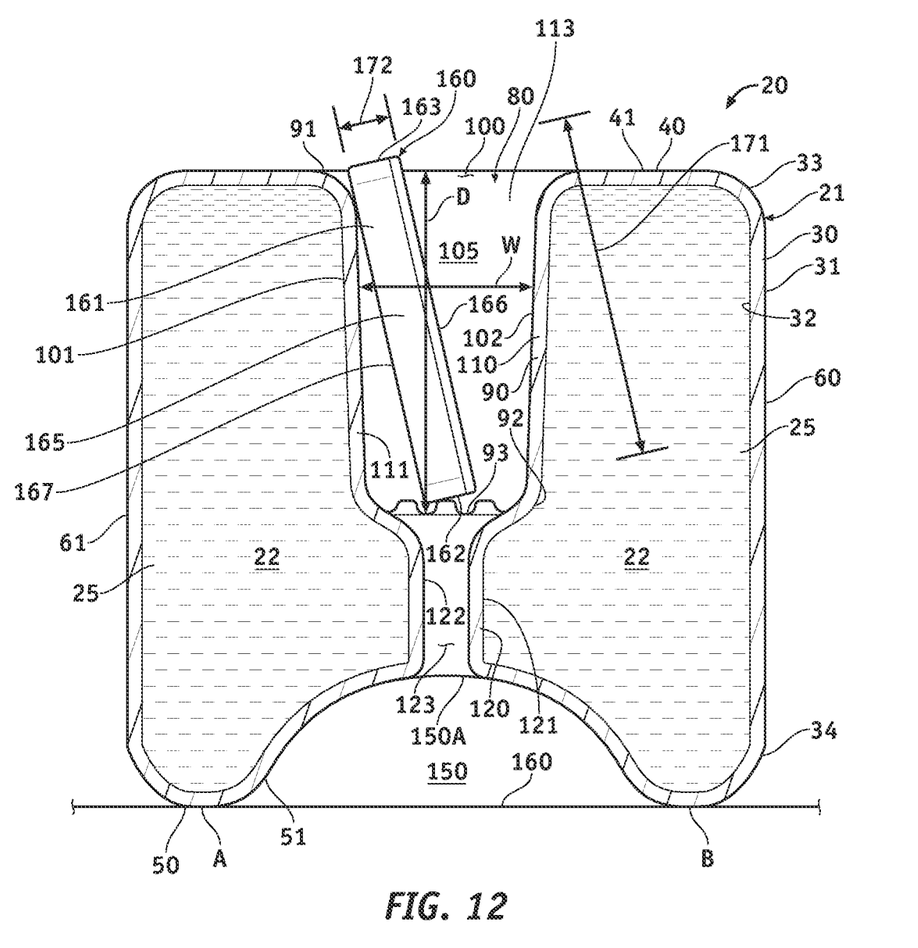
FIG. 12 is a section view taken along line 12-12 of FIG. 10 the mobile device being not sectioned for illustrative purposes.

In this example, mobile device 160 in FIG. 9 is placed by hand into storage compartment 105 through opening 100 in FIGS. 10 and 11 side 162 first in this example, which automatically becomes rested atop and directly contacts underlying protuberances 115 extending upright from base 93 in FIGS. 12 and 13, which hold mobile device 160 above base 93 and disable it from directing contacting inner surface 122 of base 93. Protuberances 115 are sufficient in number and sufficiently dispersed or otherwise spaced apart along base 93 to enable them to directly contact side 162 of mobile device 160 and thereby hold mobile device 160 above inner surface 122 of base 93 and thereby disable side 162 of mobile device 160 from coming into direct contact against inner surface 122 of base 93. Mobile phone 160 extends upright through storage compartment 105 toward opening 100 from its side 162 rested atop protuberances 115 to its opposed side 163 adjacent to opening 100 and top 40. Mobile device 160 leans to one side against inner surface 102 of storage compartment 105, in this example against inner surface 102 of sidewall 111 adjacent to opening 100. Mobile phone 160 can be identically leaned to the opposite side against inner surface 102 of sidewall 110 adjacent to opening 100. In this upright position held by cradle 80 in storage compartment 105 and contained in storage compartment 105 from side 163 proximate to opening 100 to into storage compartment 105 to side 162 rested against protuberances 115 at base 93, back surface 166 faces/confronts side wall 110 of cradle 80, and its opposed, parallel display or user-interface surface 167 faces/confronts side wall 111 of cradle 110. In FIG. 13, length L of storage compartment from outwardly bulged end wall 112 to outwardly bulged end wall 113 is sufficient to receive length 170 of mobile device 160 from end 164 to end 165, depth D of storage compartment 105 from opening 100 at top 40 to base 93 in FIG. 12 is sufficient to receive depth 171 of mobile device 160 from side 162 to side 163, and in FIG. 12 width W of storage compartment 105 from side wall 110 to side wall 111 is sufficient to receive width 172 of mobile device 160 from back surface 166 to display or user-interface surface 167, which enables cradle 80 to substantially contain mobile device 160 in storage compartment 105 and hold mobile device 160 in storage compartment 105 upright from side 162 to side 163 for locating back surface 166 to directly face side wall 110 of cradle 80 and for locating display or user-interface surface 167 to directly face side wall 111 of cradle 110 when mobile device 160 it is placed into storage compartment 105 through opening 100 side 162 first.

Being so contained upright in storage compartment 105 from edge 162 rested atop protuberances 115 to edge 163 adjacent to opening 100, the chilled or frozen refrigerant 25 in surrounding contact directly against volume-facing surface 101 of cradle 80 and volume-facing surfaces 121 of air-flow conduits 120 inherently chills cradle 80 and air-flow conduits 120. The inherent thermally-conductive material characteristic of housing 21 enables the cooling temperature imparted to refrigerant 25 to be efficiently and completely conducted by cradle 80 to into storage compartment 105 and by air-flow conduits 120 to into air-flow channels 123 for keeping storage compartment 105 and air-flow channels 123 maintained in a cool or low temperature condition for a prolonged period of time for cooling mobile device 160 in storage compartment 105. Since, back surface 166 faces/confronts and is generally coextensive with respect to side wall 110 of cradle 80 and its opposed, parallel display or user-interface surface 167 faces/confronts and is generally coextensive with respect to side wall 111 of cradle 110, surfaces 166 and 167 are directly exposed to and confront the cooling influence of refrigerant 25, back surface 166 from confronting sidewall 110 of cradle 80 and display or user-interface surface 167 from confronting sidewall 111 of cradle 80. This positioning of mobile device 160 in storage compartment 105 of cradle 80 directly cools of mobile device 160 at its major surfaces, back surface 166 from confronting sidewall 110 of cradle 80 and display or user-interface surface 167 from confronting sidewall 111 of cradle 80, which inherently efficiently cools mobile device 160.

The coupling of storage compartment 105 of cradle 80 in gaseous communication with the ambient atmosphere outside housing 21 by air-flow channels 123 that open downwardly to ventilation channel 150 enables ambient air outside housing 21 to circulate through storage compartment 105 and air-flow channels 120 between opening 100 to into storage compartment and air-flow channels 123 that open downwardly to ventilation channel 150 in response to an inherently temperature differential between the ambient atmosphere outside housing 21 and the comparatively chilled storage compartment 105 and air-flow channels 123.

The ambient air can inherently circulate through storage compartment 105 and air-flow channels 120 from opening 100 to ventilation channel 150 through air-flow channels 123, or from ventilation channel 150 through air-flow channels 123 to opening 100. As the air circulates through storage compartment 105 and air-flow channels 123, the circulating air is inherently cooled in storage compartment 105 and air-flow channels 123 by the influence of refrigerant 25 and circulates around mobile device 160 in storage compartment 105, which quickly and efficiently cools mobile device 160. This circulation of ambient air from the ambient atmosphere outside housing 21 through storage compartment 105 and air-flow channels 123 that open downwardly to ventilation channel 150 and air ventilation through ventilation channel 150 inherently develops and moves chilled air through storage compartment 105 and air-flow channels 123 for quickly and efficiently cooling mobile device 160 in storage compartment. At the same time, the circulating air through storage compartment 105 and air-flow channels 123 inherently evaporates condensation from the ambient air that can inherently collect on chilled inner surface 122 of cradle 80 and continuous inner surfaces 122 of air-flow conduits 120. Ventilation channel 150 that opens downwardly from air-flow channels 123 and that extends along the length of housing 21 from the end of housing 21 defined by end wall 62 to the end of housing 21 defined by end wall 63 advantageously enables air to translate therethrough without restriction to enable air circulation between the ambient atmosphere outside of bottom 50 and through storage compartment 105 and air-flow channels 123.

Air-flow conduits 120 are additionally drains by which condensation that develops on inner surface 122 of cradle 80 drains downwardly through air-flow channels 123 by gravity from storage compartment 105 to outwardly through bottom 50, which helps to keep mobile device 160 dry and free from condensed moisture in storage compartment 80. Because protuberances 115 hold mobile device 160 above base 93 and disable it from directing contacting base 93, mobile phone 160 is held upwardly away from base 93 thereby disabling mobile phone 160 from sitting in condensation that may develop on inner surface 122 of base 93 and becoming water damaged.

Since side 163 is located proximate to opening 100 of compartment 105, side 163 may be easily taken up by hand for withdrawing mobile device 160 from storage compartment 105 as desired. Mobile device 160 may be repeatedly installed into and withdrawn from storage compartment 105 for cooling mobile device 160 as needed. Cooler device 20 may also be repeatedly placed into a refrigerator or freezer as desired for chilling or freezing refrigerant 25 for repeated use.

Figure 14:
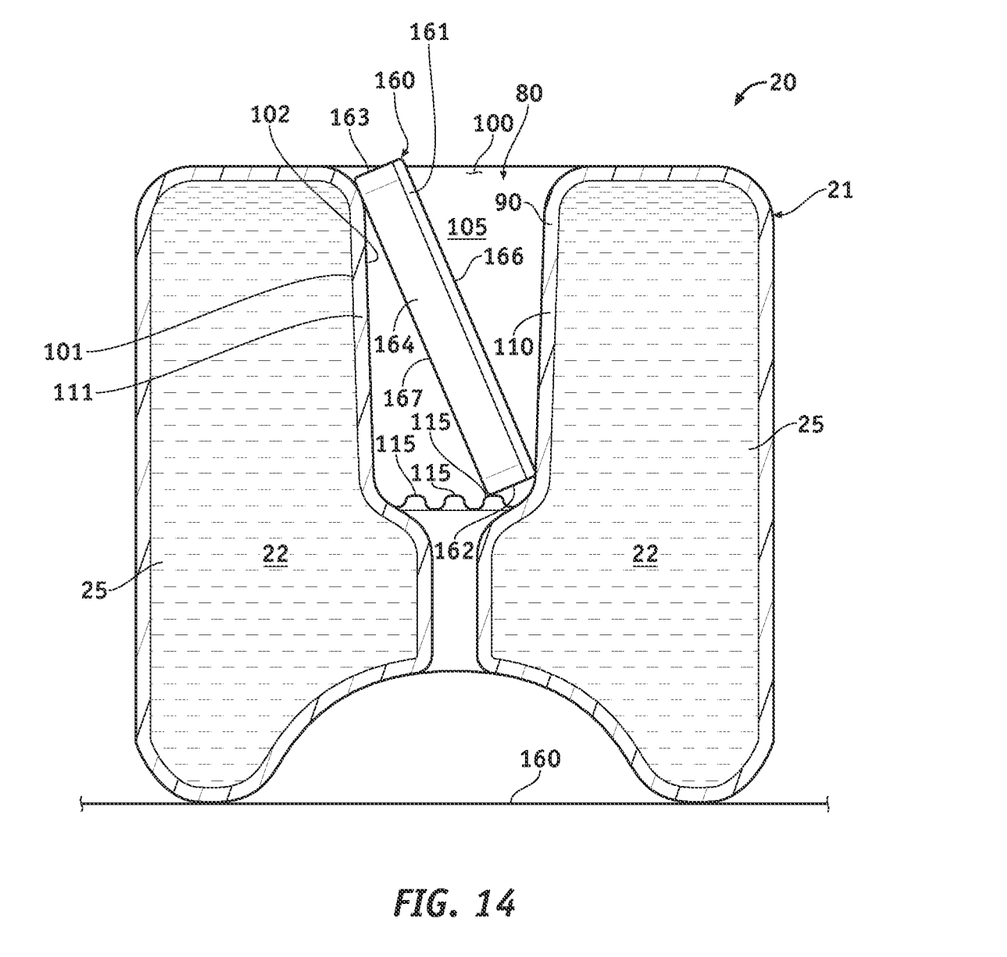
FIG. 14 is a view similar to FIG. 12 illustrating an alternate orientation of the electronic mobile device relative to the cradle.

In FIG. 12, side 162 of mobile device 160 is shown positioned centrally atop protuberances 115. In a corresponding view, FIG. 14 shows side 162 of mobile device 160 as it may appear positioned atop protuberances 115 to the side toward side wall 110. This orientation may be reversed when side 162 of mobile device 160 is positioned atop protuberances 115 to the side toward side wall 111. Accordingly, regardless where side 162 is positioned atop protuberances 115, whether centrally or to one side or the other in compartment 105, protuberances 115 are sufficient in number and sufficiently dispersed to hold mobile device 160 above base 93 and disable it from directing contacting base 93. In the present example, mobile device 160 is installed into storage compartment 105 upright from side 162 to side 163. Mobile device 160 can be identically installed into storage compartment 105 upright from side 163 to side 162.

Although compartment 105 is sized to accept mobile device 160 upright from side 162 to side 163 and identically from side 163 to side 162, it may be sized to accept mobile device 160 upright from end-to-end, whether form end 164 to end 165 or identically from end 165 to end 164, without departing from the invention. Those having ordinary skill will readily appreciate that storage compartment 105 can be sized to accept and contain any electronic mobile device having any size and shape, and hold it upright as described herein, whether upright from one side to the other, or from one end to the other, for providing direct cooling of it via its major faces.

In the embodiment disclosed, housing 21 is formed with three air-flow conduits 120 and, thus, three air-flow channels 123. In alternate embodiments, housing 21 can be formed with more than three air-flow conduits 120 and, thus, more than three air-flow channels 123, or less than three air-flow conduits 120 and, thus, less than three air-flow channels 123. Preferably, a housing 21 constructed and arranged in accordance with the principle of the invention has at least one air-flow conduit 120 and, thus, at least one air-flow channel 123.

In sum, cooler device 20 for receiving, storing, and cooling an electronic mobile device is disclosed, which includes housing 21 defining enclosed volume 22 and including top 40, bottom 50, cradle 80, at least one air-flow conduit 120. Cradle 80 depends downwardly into volume 22 from top 40 of housing 21 to base 93 of cradle 80 in volume 22 between top 40 of housing 21 and bottom 45 of housing 21. Cradle 80 includes opening 100 at top 40 of housing 21, volume-facing surface 101 from top 40 of housing 21 to and including base 93 of cradle 80, and inner surface 102 from top 40 of housing 21 to and including base 93 of cradle 80 defining storage compartment 105 between opening 100 of cradle 80 and base 93 of cradle 80 and configured to receive the electronic mobile device therein through opening 100. The at least one air-flow conduit 120 is coupled between base 93 of cradle 80 and bottom 50 of housing 21 and includes continuous volume-facing surface 121 from base 93 of cradle 80 to bottom 50 of housing 21, and continuous inner surface 122 from base 93 of cradle 80 to bottom 50 of housing 21 and defining airflow channel 123 coupling storage compartment 105 of cradle 80 to an ambient atmosphere outside housing 21 in gaseous communication. Volume 22 is filled with refrigerant 25 in direct contact against volume-facing surface 101 of cradle 80 and continuous volume-facing surface 122 of the at least one air-flow conduit 120. Preferably, refrigerant 25 envelops a) cradle 80 from top 40 of housing 21 to base 93 of cradle 80, and thereby volume-facing surface 101 of cradle 80 from top 40 of housing 21 to base 93 of cradle 80, and b) the at least one air-flow conduit 120 from base 93 of cradle 80 to bottom 50 of housing 21, and thereby continuous volume-facing surface 121 of the at least one air-flow conduit 120 from base 93 of cradle 80 to bottom 50 of housing 21. Cradle 80 additionally includes a standoff structure for interacting between base 93 of cradle 80 and the electronic mobile device for holding the electronic mobile device away from base 93 of cradle 80, when the electronic mobile device is inserted into storage compartment 105 of cradle 80 through opening 100. The standoff structure includes standoff prominences 115 each configured to directly contact the electronic mobile device, when the electronic mobile device is inserted into storage compartment 105 of cradle 80 through opening 100. Standoff prominences 115 are carried by base 93, are spaced-apart and dispersed along base 93, and extend upright into storage compartment 105 toward opening 100 and away from base 93. Standoff prominences 115 are on either side of the at least one air-flow channel 123. Standoff prominences 115 are identical in a particular embodiment. Housing 21 has a sufficient rigidity to not collapse. Bottom 50 of housing 21 defines ventilation channel 150 that opens downwardly from the at least one air-flow channel 123 and extends from a first end of housing 21 defined by end wall 62 to a second end of housing 21 defined by end wall 63. Ventilation channel 150 has center 150A that extends from the first end of housing 21 to the second end of housing 21, and the at least one air flow channel 123 open outwardly to center 150A of ventilation channel 150. Ventilation channel 150 has an inverted U-shape in an exemplary embodiment.

According to another embodiment of the invention, cooler device 20 for receiving, storing, and cooling an electronic mobile device is disclosed, which includes housing 21 defining enclosed volume 22 and including top 40, bottom 50, cradle 80, and air-flow conduits 120. Cradle 80 depends downwardly into volume 22 from top 40 of housing 21 to base 93 of cradle 80 in volume 22 between top 40 of housing 21 and bottom 45 of housing 21. Cradle 80 includes opening 100 at top 40 of housing 21, volume-facing surface 101 from top 40 of housing 21 to and including base 93 of cradle 80, and inner surface 102 from top 40 of housing 21 to and including base 93 of cradle 80 defining storage compartment 105 between opening 100 of cradle 80 and base 93 of cradle 80 and configured to receive the electronic mobile device therein through opening 100. Air-flow conduits 120 are coupled between base 93 of cradle 80 and bottom 50 of housing 21 and each includes continuous volume-facing surface 121 from base 93 of cradle 80 to bottom 50 of housing 21, and continuous inner surface 122 from base 93 of cradle 80 to bottom 50 of housing 21 and defining airflow channel 123 coupling storage compartment 105 of cradle 80 to an ambient atmosphere outside housing 21 in gaseous communication. Volume 22 is filled with refrigerant 25 in direct contact against volume-facing surface 101 of cradle 80 and continuous volume-facing surface 122 of each one of the air-flow conduits 120. Preferably, refrigerant 25 envelops a) cradle 80 from top 40 of housing 21 to base 93 of cradle 80, and thereby volume-facing surface 101 of cradle 80 from top 40 of housing 21 to base 93 of cradle 80, and b) air-flow conduits 120 from base 93 of cradle 80 to bottom 50 of housing 21, and thereby continuous volume-facing surfaces 121 of air-flow conduits 120 from base 93 of cradle 80 to bottom 50 of housing 21. Cradle 80 additionally includes a standoff structure for interacting between base 93 of cradle 80 and the electronic mobile device for holding the electronic mobile device away from base 93 of cradle 80, when the electronic mobile device is inserted into storage compartment 105 of cradle 80 through opening 100. The standoff structure includes standoff prominences 115 each configured to directly contact the electronic mobile device, when the electronic mobile device is inserted into storage compartment 105 of cradle 80 through opening 100. Standoff prominences 115 are carried by base 93, are spaced-apart and dispersed along base 93, and extend upright into storage compartment 105 toward opening 100 and away from base 93. Standoff prominences 115 are on either side of each of the air-flow channels 123. Standoff prominences 115 are identical in a particular embodiment. Housing 21 has a sufficient rigidity to not collapse. Bottom 50 of housing 21 defines ventilation channel 150 that opens downwardly from the air-flow channels 123 and extends from a first end of housing 21 defined by end wall 62 to a second end of housing 21 defined by end wall 63. Ventilation channel 150 has center 150A that extends from the first end of housing 21 to the second end of housing 21, and the air flow channels 123 open outwardly to center 150A of ventilation channel 150. Ventilation channel 150 has an inverted U-shape in an exemplary embodiment.

Those having ordinary skill in the art will readily appreciate that an exemplary cooler device 20 is disclosed. Cooler device 20 is especially useful for cooling heat-sensitive electronic mobile devices and orienting them upright for exposing their major surfaces to the cooling influence of a refrigerant, is portable, being easily movable and carried about by hand, and is simple in structure, unpowered, and inexpensive with no moving or electrical parts. Again, storage compartment 105 can be sized to accept and contain any electronic mobile device having any size and shape, and hold it upright as described herein, whether upright from one side to the other, or from one end to the other, for providing direct cooling of it via its major faces.

The present invention is described above with reference to illustrative embodiments. However, those skilled in the art will recognize that changes and modifications may be made in the described embodiments without departing from the nature and scope of the present invention. Various changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

The invention claimed is:

1. A cooler device for receiving, storing, and cooling an electronic mobile device, comprising:
   a housing defining an enclosed volume and including a top, a bottom, a cradle depending downwardly into the volume from the top of the housing to a base of the cradle in the volume between the top of the housing and the bottom of the housing, the cradle including an opening at the top of the housing, a volume-facing surface from the top of the housing to and including the base of the cradle, and an inner surface from the top of the housing to and including the base of the cradle defining a storage compartment between the opening of the cradle and the base of the cradle and configured to receive the electronic mobile device therein through the opening, and at least one air-flow conduit coupled between the base of the cradle and the bottom of the housing and including a continuous volume-facing surface from the base of the cradle to the bottom of the housing, and a continuous inner surface from the base of the cradle to the bottom of the housing and defining an airflow channel coupling the storage compartment of the cradle to an ambient atmosphere outside the housing in gaseous communication; and
   the volume filled with a refrigerant in direct contact against the volume-facing surface of the cradle and the continuous volume-facing surface of the at least one air-flow conduit.

2. The cooler device according to claim 1, wherein the refrigerant envelops a) the cradle from the top of the housing to the base of the cradle, and thereby the volume-facing surface of the cradle from the top of the housing to the base of the cradle, and b) the at least one air-flow conduit from the base of the cradle to the bottom of the housing, and thereby the volume-facing surface of the at least one air-flow conduit from the base of the cradle to the bottom of the housing.

3. The cooler device according to claim 1, wherein the cradle additionally includes a standoff structure for interacting between the base of the cradle and the electronic mobile device for holding the electronic mobile device away from the base of the cradle, when the electronic mobile device is inserted into the storage compartment of the cradle through the opening of the cradle.

4. The cooler device according to claim 3, wherein the standoff structure comprises standoff prominences each configured to directly contact the electronic mobile device, when the electronic mobile device is inserted into the storage compartment of the cradle through the opening of the cradle.

5. The cooler device according to claim 4, wherein the standoff prominences are carried by the base of the cradle, and extend upright into the storage compartment of the cradle.

6. The cooler device according to claim 5, wherein the standoff prominences are on either side of the air-flow channel.

7. The cooler device according to claim 1, wherein the housing has a sufficient rigidity to not collapse.

8. The cooler device according to claim 1, wherein the bottom of the housing defines a ventilation channel that opens downwardly from the air-flow channel and extends from a first end of the housing to a second end of the housing.

9. The cooler device according to claim 8, wherein the ventilation channel has a center that extends from the first end of the housing to the second end of the housing, and the air flow channel opens outwardly to the center of the ventilation channel.

10. The cooler device according to claim 9, wherein the ventilation channel has an inverted U-shape.

11. A cooler device for receiving, storing, and cooling an electronic mobile device, comprising:
    a housing defining an enclosed volume and including a top, a bottom, a cradle depending downwardly into the volume from the top of the housing to a base of the cradle in the volume between the top of the housing and the bottom of the housing, the cradle including an opening at the top of the housing, a volume-facing surface from the top of the housing to and including the base of the cradle, and an inner surface from the top of the housing to and including the base of the cradle defining a storage compartment between the opening of the cradle and the base of the cradle and configured to receive the electronic mobile device therein through the opening, and air-flow conduits coupled between the base of the cradle and the bottom of the housing, the air-flow conduits are spaced apart and each includes a continuous volume-facing surface from the base of the cradle to the bottom of the housing, and a continuous inner surface from the base of the cradle to the bottom of the housing and defining an airflow channel coupling the storage compartment of the cradle to an ambient atmosphere outside the housing in gaseous communication; and
    the volume is filled with a refrigerant in direct contact against the volume-facing surface of the cradle and the continuous volume-facing surfaces of the air flow conduits.

12. The cooler device according to claim 11, wherein the refrigerant envelops a) the cradle from the top of the housing to the base of the cradle, and thereby the volume-facing surface of the cradle from the top of the housing to the base of the cradle, and b) the air-flow conduits from the base of the cradle to the bottom of the housing, and thereby the continuous volume-facing surfaces of the air-flow conduits from the base of the cradle to the bottom of the housing.

13. The cooler device according to claim 11, wherein the cradle additionally includes a standoff structure for interacting between the base of the cradle and the electronic mobile device for holding the electronic mobile device away from the base of the cradle, when the electronic mobile device is inserted into the storage compartment of the cradle through the opening of the cradle.

14. The cooler device according to claim 13, wherein the standoff structure comprises standoff prominences each configured to directly contact the electronic mobile device, when the electronic mobile device is inserted into the storage compartment of the cradle through the opening of the cradle.

15. The cooler device according to claim 14, wherein the standoff prominences are carried by the base of the cradle, and extend upright into the storage compartment of the cradle.

16. The cooler device according to claim 15, wherein the standoff prominences are on either side of each of the air-flow channels.

17. The cooler device according to claim 11, wherein the housing has a sufficient rigidity to not collapse.

18. The cooler device according to claim 11, wherein the bottom of the housing defines a ventilation channel that opens downwardly from said air-flow channels and extends from a first end of the housing to a second end of the housing.

19. The cooler device according to claim 18, wherein the ventilation channel has a center that extends from the first end of the housing to the second end of the housing, and the air flow channels open outwardly to the center of the ventilation channel.

20. The cooler device according to claim 19, wherein the ventilation channel has an inverted U-shape.

* * * * *